United States Patent
Adi et al.

(10) Patent No.: US 9,201,581 B2
(45) Date of Patent: Dec. 1, 2015

(54) VISUAL RULES FOR DECISION MANAGEMENT

(71) Applicant: International Business Machines Corporation, Armonk, NY (US)

(72) Inventors: Asaf Adi, Qiryat Ata (IL); Sarit Arcushin, Haifa (IL); Peter Bak, Haifa (IL); Dolev Dotan, Oshrat (IL); Alexander Kofman, Haifa (IL); Avi Yaeli, Ramot Menashe (IL); Tali Yatzkar-Haham, Misgav (IL); Gilad Saadoun, Haifa (IL); Guy Sharon, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/955,005

(22) Filed: Jul. 31, 2013

(65) Prior Publication Data

US 2015/0040064 A1    Feb. 5, 2015

(51) Int. Cl.
G06K 9/00    (2006.01)
G06F 3/0484    (2013.01)
G06F 3/0481    (2013.01)

(52) U.S. Cl.
CPC ........ *G06F 3/04847* (2013.01); *G06F 3/04817* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 5,969,755 | A * | 10/1999 | Courtney | 348/143 |
| 7,667,596 | B2 * | 2/2010 | Ozdemir et al. | 340/541 |
| 8,271,541 | B2 | 9/2012 | Mohan et al. | |
| 8,564,661 | B2 * | 10/2013 | Lipton et al. | 348/143 |
| 2004/0143602 | A1 * | 7/2004 | Ruiz et al. | 707/104.1 |
| 2004/0215599 | A1 | 10/2004 | Apps et al. | |
| 2008/0262983 | A1 | 10/2008 | Chan et al. | |
| 2009/0179998 | A1 * | 7/2009 | Steinberg et al. | 348/222.1 |
| 2009/0322881 | A1 * | 12/2009 | Shu et al. | 348/148 |
| 2010/0098342 | A1 * | 4/2010 | Davis et al. | 382/220 |
| 2010/0207762 | A1 * | 8/2010 | Lee et al. | 340/541 |
| 2011/0004632 | A1 | 1/2011 | Martino et al. | |
| 2011/0244919 | A1 * | 10/2011 | Aller et al. | 455/556.1 |
| 2011/0302526 | A1 | 12/2011 | Thorpe et al. | |
| 2012/0215732 | A1 | 8/2012 | Burckart et al. | |

OTHER PUBLICATIONS

Koperski et al., "Discovery of spatial association rules in geographic information databases", SSD '95, Proceedings of the 4th International Symposium on Advances in Spatial Databases, pp. 47-66, 1995.
Keim et al., "Visual data mining", Eurographics STARs, 2002.
Kotsiantis et al., "Association rules mining: a recent overview", GESTS International Transactions on Computer Science and Engineering, vol. 32 (1), 2006, pp. 71-82.
Sengstock et al., "Exploring volunteered geographic information using scale-dependent frequent pattern mining", GIScience 2010, Sixth International conference on Geogrgraphic Information Science, Zurich, Sep. 2010.

* cited by examiner

*Primary Examiner* — Matthew Bella
*Assistant Examiner* — Soo Shin

(57) ABSTRACT

A computerized method for generating monitoring rules, comprising: presenting to a user a spatio-temporal data indicative of a plurality of spatio-temporal attributes of a plurality of image objects in a space during a period; selecting, by a user, at least one of a spatial pattern and a temporal pattern represented in said spatio-temporal data; analyzing said at least one of a spatial pattern and a temporal pattern to identify at least one of a spatial related characteristic of at least some of said plurality of image objects and a temporal related characteristic of at least some of said plurality of image objects; automatically generating at least one monitoring rule to track an occurrence of said at least one of a location related characteristic and a temporal related characteristic.

18 Claims, 9 Drawing Sheets

VISUAL RULES FOR DECISION MANAGEMENT

BACKGROUND

The present invention, in some embodiments thereof, relates to operational decision management and, more specifically, but not exclusively, to generating rules for operational decision management.

Operational decision management is a growing discipline of importance for organizations seeking to improve and automate information-based decisions. Business Rule Management and Event Processing Systems enable organization to design, author, manage and execute business logic rules and policies in operational systems, such as GeoFence, Platform and the Complex Event Processing (CEP).

Such tools also provide an interface for users to customize the rules and be self-service as possible, in order to respond to changing business needs. One of goals of such tools is to create minimal dependency on information technology (IT) personal for accomplishing similar tasks.

Information-based decisions are often assisted by business rules and systems for generating and managing them. Decisions may be described by rules such as: If attribute A=X and attribute B>Y than system performs an action. Typically, a user can select attributes and predicates to form such an expression as a business rule in such information based decision system.

SUMMARY

According to an aspect of some embodiments of the present invention there is provided a computerized method for generating monitoring rules, comprising: presenting to a user a spatio-temporal data indicative of a plurality of spatio-temporal attributes of a plurality of image objects in a space during a period; selecting, by a user, at least one of a spatial pattern and a temporal pattern represented in the spatio-temporal data; analyzing the at least one of a spatial pattern and a temporal pattern to identify at least one of a location related characteristic of at least some of the plurality of image objects, a temporal related characteristic of at least some of the plurality of image objects and a non-temporal non-spatial characteristic of at least some of the plurality of image objects; automatically generating at least one quantifiable monitoring rule to track an occurrence of the at least one of a location related characteristic and a temporal related characteristic.

Optionally, the spatio-temporal data is provided by a sequence of images depicting movement of the plurality of image objects in the space. Optionally, location related characteristic is a combination of a portion of the plurality of spatio-temporal attributes. Optionally, selecting by a user is performed by visually exploring the image and by choosing at least one of a plurality of elements of the image. Optionally, visually exploring is performed by applying at least one of: a filtering condition to the image, a filtering condition to the plurality of image objects, a filtering condition to the plurality of spatio-temporal attributes, mapping at least one of the plurality of spatio-temporal attributes to the plurality of image objects, coloring code mapped the at least one of the plurality of spatio-temporal attributes, mapping at least one of the plurality of spatio-temporal attributes to a visually distinct shape and generating a spatio-temporal attribute for the plurality of image objects by relating at least a pair of the plurality of spatio-temporal attributes; the choosing is performed by at least one of: selecting a sub area of the space during a certain time frame of the period, hovering over an object of the plurality of image objects, clicking on an object of the plurality of image objects and tagging an object of the plurality of image objects; and the analyzing is performed according to the visually exploring. Optionally, at least one element of the image is at least one of: a region of the image, at least one of the plurality of spatio-temporal attributes, and at least one of the plurality of image object. Optionally, selecting by a user is performed by a plurality of modifying actions and the automatically generating a plurality of monitoring rule elements is performed according to each action. Optionally, the method further comprises: recognizing a plurality of relationships between the plurality of modifying actions; filtering a sub-set of the plurality of modifying actions according to recognized the plurality of relationships. Optionally, the method further comprises: applying the at least one monitoring rule to an inspected image. Optionally, the method further comprises: applying the at least one monitoring rule to a plurality of dynamic image objects, each having a plurality of changing spatio-temporal attributes. Optionally, the method further comprises: defining, by a user, at least one condition for applying the at least one monitoring rule. Optionally, displaying to a user an image is triggered by availability of image data. Optionally, automatically generating a plurality of monitoring rule elements is performed by extracting filter elements from a filter used for the selecting. Optionally, automatically generating a plurality of monitoring rule elements is performed by extracting at least one mapping attribute from a visual mapping used for the selecting. Optionally, automatically generating a plurality of monitoring rule elements is performed by extracting a second plurality of spatio-temporal attributes from a selected region of the image. Optionally, automatically generating a plurality of monitoring rule elements is performed by extracting a second plurality of spatio-temporal attributes from a selected region of the image.

According to an aspect of some embodiments of the present invention there is provided a computerized method for generating monitoring rules, comprising: a computer readable storage medium; first program instructions to display, to a user, an image having a plurality of image objects, each having a plurality of spatio-temporal attributes; second program instructions to enable a user to modify displayed the image; third program instructions to automatically generate a plurality of monitoring rule elements according to modified the image; fourth program instructions to enable a user to create at least one monitoring rule using at least one of the plurality of monitoring rule elements; wherein the first, second, third and fourth program instructions are stored on the computer readable storage medium.

According to an aspect of some embodiments of the present invention there is provided a system comprising: a processor; a user interface enabling a user to select at least one of a spatial pattern and a temporal pattern represented in a spatio-temporal data which is presented thereto; a displaying unit which displays to a user the spatio-temporal data indicative of a plurality of spatio-temporal attributes of a plurality of image objects in a space during a period; and an element suggestion engine which analyzes the at least one of a spatial pattern and a temporal pattern to identify at least one of a location related characteristic of at least some of the plurality of image objects and a temporal related characteristic of at least some of the plurality of image objects; and automatically generates a monitoring rule according to selected the spatial pattern and temporal pattern.

Optionally, the element suggestion engine, automatically generates a plurality of monitoring rule elements according to modified said selected said spatial pattern and temporal pattern wherein said monitoring rule comprises at least one of said monitoring rule elements. Optionally, the user interface enables a user to modify displayed said image and to create, at least one monitoring rule using at least one of said plurality of monitoring rule elements.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussions of embodiments of the invention. In this regard, the description taken with the drawings making apparent to those skilled in the how embodiments of the invention may be practiced.

In the drawings.

DETAILED DESCRIPTION

Figure 1:
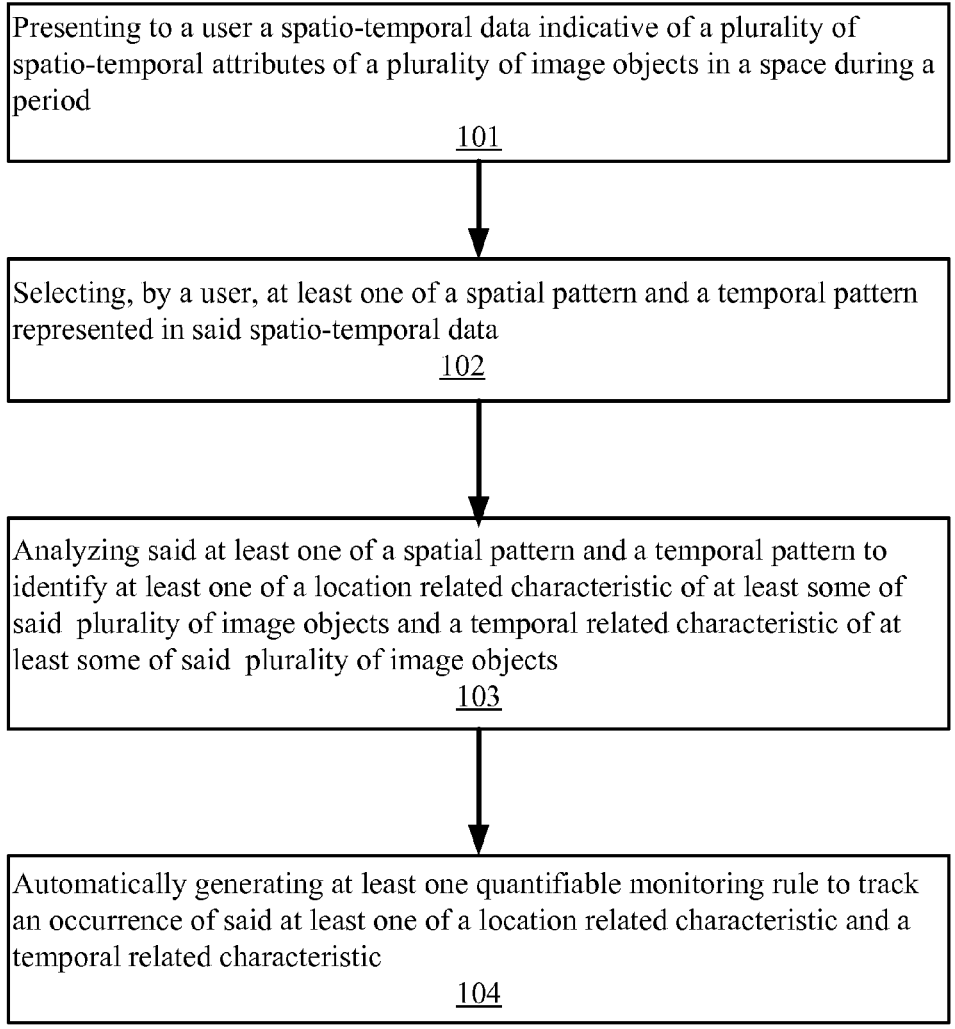
FIG. 1 is a flowchart of a computerized method for generating monitoring rules, according to some embodiments of the present invention.

The present invention, in some embodiments thereof, relates to operational decision management and, more specifically, but not exclusively, to generating rules for operational decision management.

In many recently evolved domains that involve spatial information and/or moving objects, such as mobile telephony, rules needed for supporting information-based decisions are becoming increasingly complicated. Complication may be a result of an increasing number of dimensions required to describe a given state, a growing number of stake holders in a single decision etc. For example, a business user needs to define rules for alerting an entity regarding safety exception(s) based on monitoring parameters of light vehicles and heavy trucks in a mine Some aspects of the rule may involve setting speed limits in a given area or path and/or limits on the presence of vehicles and/or trucks in restricted access areas. Such limitations are difficult to express numerically in an expression builder. Moreover, in many cases a user is not able to determine the specific parameters and the conditions before visualizing the data itself, e.g. viewing historical data of noteworthy patterns (accidents and/or near-accidents).

According to some embodiments of the present invention, a user is displayed with a representation, for example a spatial representation, a temporal representation or a spatiotemporal representation, of real events occurring, optionally in real time, in a monitored environment, such as a space. For example, the representation includes a visual display, an image and/or a sequence of images representing an actual behavior of entities in a physical space and/or an actual trend of monitored parameters of entities in the monitored environment. The user selects one or more display elements such as images, objects, regions, portion(s) of image(s) and/or time segments in the representation which, according to his opinion, are indicative of a noteworthy pattern that should be monitored automatically, for example a potentially dangerous pattern, a potentially profitable pattern, a regulation non-conforming pattern, a risky pattern and/or the like. The user selection is translated to a monitoring rule and/or elements used for composing a monitoring rule. An analysis of the selected is required for rule generation. The analysis recognized a pattern in the user's selection. The pattern comprises contextual attributes which may be spatial, non-spatial, temporal, non-temporal and/or a combination of thereof. Optionally, during the selection process, a user visually explores spatial and/or temporal attributes of image objects by applying filters, zooming in and/or out, add features such as measurements etc. The user activities during the visual exploration are translated to monitoring rules and/or elements for composing monitoring rules. Elements of suggested monitoring rules (for example spatial coupling of object type 1 with object type 2) may be generated according to the type of visual exploration method applied by the user (for example apply object type filter) and/or the content of the visual exploration (for example, choosing object type 1 and object type 2). The monitoring rules are used to analyze a stream of data from sensors monitoring the monitored environment, for example in real time, and to generate, based on the analysis, automatic notifications, such as alerts and/or log events, when noteworthy patterns occur. The ability of the user to create automatically monitoring rules for a monitored space by identifying actual noteworthy patterns in a representation of actual data reduces the time it takes to create monitoring rules and/or provide an intuitive user interface that creates monitoring rules, optionally multivariate, based on a single representation and/or a single spatial or spatiotemporal display.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Reference is now made to FIG. 1 illustrating a computerized method 100 for generating monitoring rules, according to some embodiments of the present invention. First, a user is presented with image objects 101, such as vessels, haul trucks and electricity meters illustrated in FIGS. 3A-3E and 4-5. The image represents actual behavior of image object entities in space and/or measurements of actual trends of monitored parameters. The image objects are illustrated in a space during a time period. Each image object has spatial, temporal, spatio-temporal attributes and/or additional attributes which are non-spatial and/or non-temporal. An exemplary spatial attribute is a haul truck movement direction. Exemplary additional attributes are vessel size, and/or night time aggregated electricity consumption. The additional attributes may be context dependent. The term context, as defined herein, means an ability to distinct a group of selected object from the remaining un-selected objects by an attribute. Spatial, temporal and/or spatio-temporal data indicative of such spatio-temporal attributes is provided to the user. For example, size of an elliptic shape is indicative of buoyancy size and circle color is indicative of truck stationary state. Next, the user visually explores the image objects and their respective attributes 102. The visual exploration is performed by selecting a spatial pattern and/or a temporal pattern, as detailed in FIGS. 3A-3E and 4-5. The user indicates a noteworthy pattern such as a risky pattern, a regulation non-conforming pattern etc. Next, the selected spatial pattern and/or temporal pattern are analyzed 103. The analysis may be application of an aggregation, a mathematical calculation, a statistical test and/ or an algorithm to the pattern(s). Optionally, once multiple spatial patterns are explored and/or selected by a user, the relations between the spatial patterns are estimated and a policy for analyzing multiple patterns is employed. For example, if a user zooms to a region of an image by applying the zoom multiple times in growing resolutions only the last selected region is used for spatial pattern analysis. Alternatively, multiple regions are generated: the region displayed by the last zoom and the region displayed prior to first zoom excluding the region displayed by the last zoom. Based on the analysis, location related characteristic(s) and/or temporal related characteristic(s) are identified. Finally, quantifiable monitoring rule(s) are automatically generated 104. Each monitoring rule tracks an occurrence of location related characteristic(s) and /or temporal related characteristic(s). The characteristics are quantified, i.e. assessed numerically, enabling a computer program to automatically assess if a monitoring rule is satisfied or not based on observed characteristics. The monitoring rule may be applied to a single image, a collection of images, a sequence of images, a stream of images, and/or image objects. Optionally, the monitoring rule generates different alert levels according to the occurrences fulfilling the rule's conditions. For example, a haul truck taking a turn into a road with a single-lane segment having another stationary truck at its opposite side gets a low level alert. A high level alert is created if the stationary truck starts moving. The monitoring frequency may change once a high level alert is created. Optionally, multiple images are presented to a user. The user visually explores and/or indicates a noteworthy pattern in a one or more image.

Optionally, the method 100 enables to choose objects and as a result defines an area according to the location of the objects and contours, regions, obstacles and other objects in the visual display. Such an embodiment of the current invention, improves over simple geo fencing, as it simplifies the process of region definition.

Figure 2:
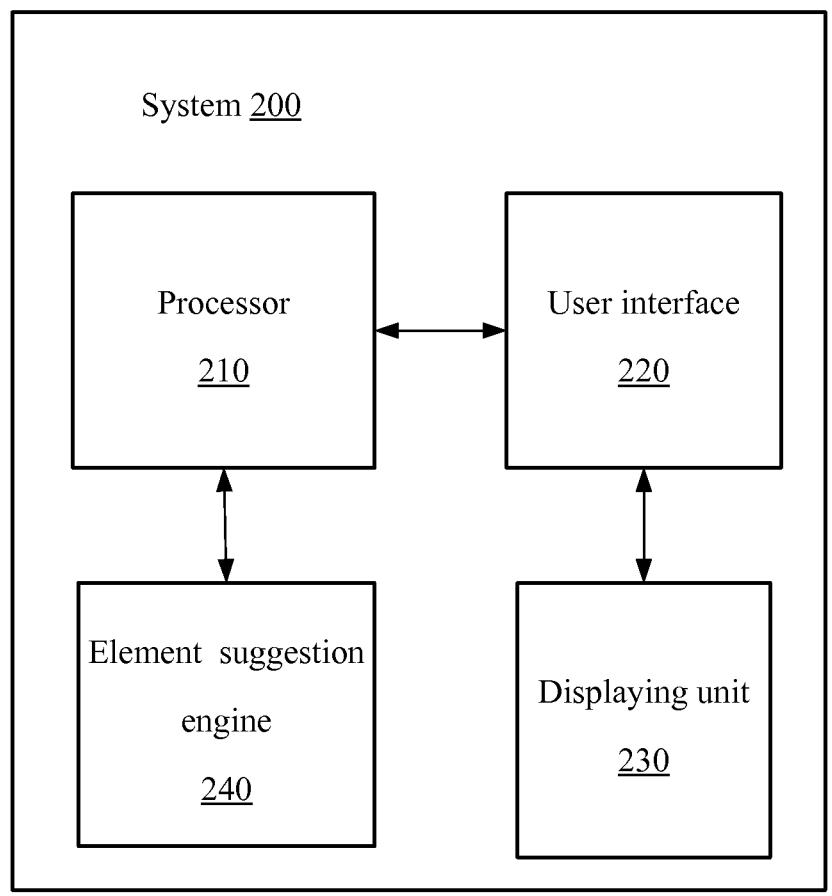
FIG. 2 is a schematic illustration of a system for generating and monitoring rules, according to some embodiments of the present invention.

Reference is now made to FIG. 2, schematically illustrating a system 200 for generating and monitoring rules, according to some embodiments of the present invention. The system comprises: a processor 210, a user interface 220, a displaying unit 230 and an element suggestion engine 240. The displaying unit 230 exhibits an image to a user. The image is composed of image objects such as vessels, port regions, roads, haul tracks, fire exits, airport isles, hospital beds, elevators, open space regions, cash registries etc. Each image object has spatio-temporal attributes as described above. The image may represent actual behaviors of objects in a physical space. The image may represent actual measurements and/or actual trends of monitored parameters for physical objects represented by image objects. Optionally, the actual measurements and/or actual trends are processed prior to displaying by the display unit 230. Preprocessing may comprise measurements normalization, weighted combination of parameters, applying a mathematical formula and the like. Optionally, the processor 210 prepares the raw data, such as Global Positioning System (GPS) location data, for display by the displaying unit 230. The user interface 220 allows a user to visually explore an image. The visual exploration may include, for example, applying a filter, applying a threshold, zooming, color coding etc. as detailed in FIGS. 3A-3E. The visual exploration process may alter, modify and/or change the image. The user interface enables a user to indicate a noteworthy pattern. The element suggestion engine 240 generates monitoring rule elements. Monitoring rule elements are, for example, a region of an image, distance between image objects, objects count etc. Optionally, monitoring rule elements include parameters. For example, the monitoring rule element of vessels distance is defined as: distance between a vessel and a pilot is defined as smaller than 400 meters. The monitoring rule elements are generated, by the element suggestion engine 240, according to the modified image following the user's visual exploration of the image and/or an indication of one (or more) noteworthy pattern(s). The elements generated by the element suggestion engine 240 may be automatically combined into monitoring rules, for example by addition of all logical relations combinations between them. Optionally, the elements suggested by the element suggestion engine 240 are presented to a user by the display unit 230. The user is able to interact with the suggested monitoring rule elements through the user interface 220. The user may combine suggested elements, add logical relations between them and/or change their parameters. Optionally, the monitoring rules are generated by the user interaction with the suggested elements.

Figure 3A:
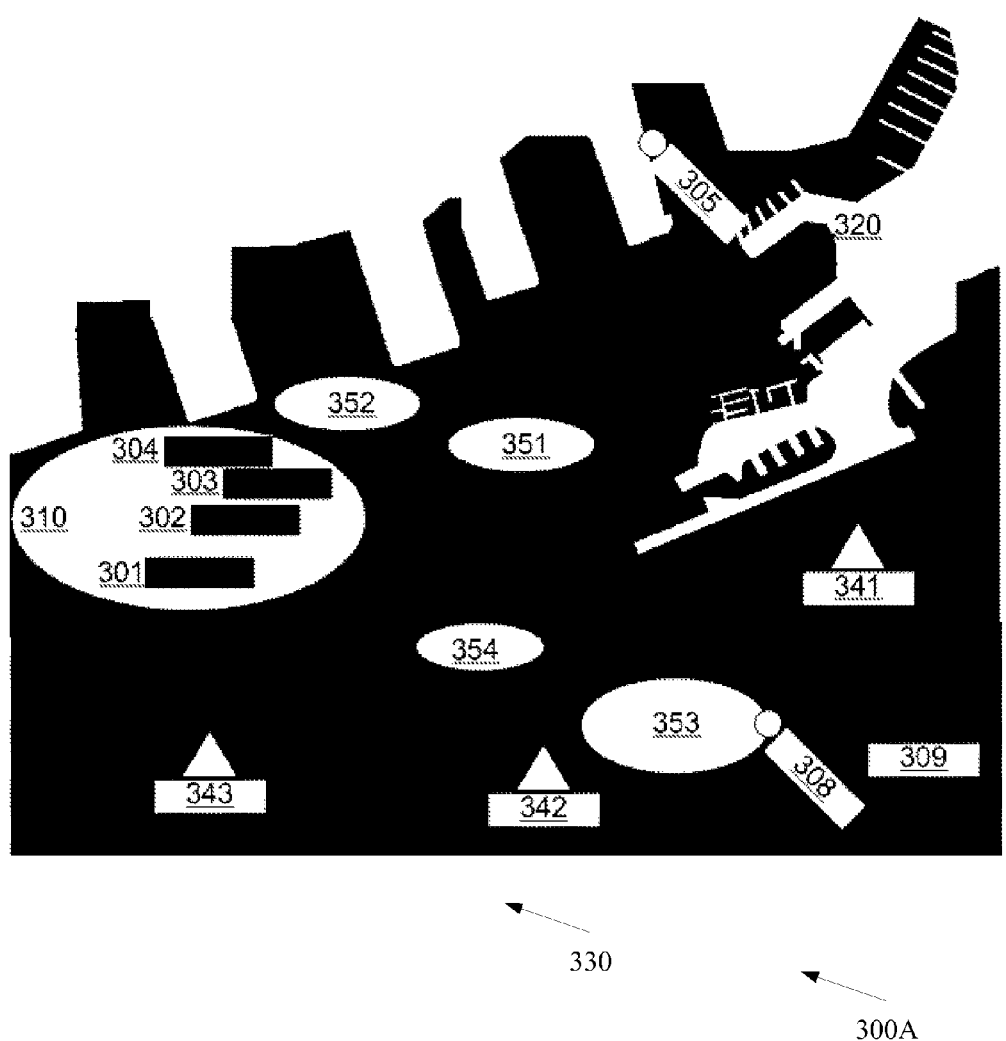
FIG. 3A is a schematic top view illustration of a port before visual exploration, according to some embodiments of the present invention.
Figure 3B:
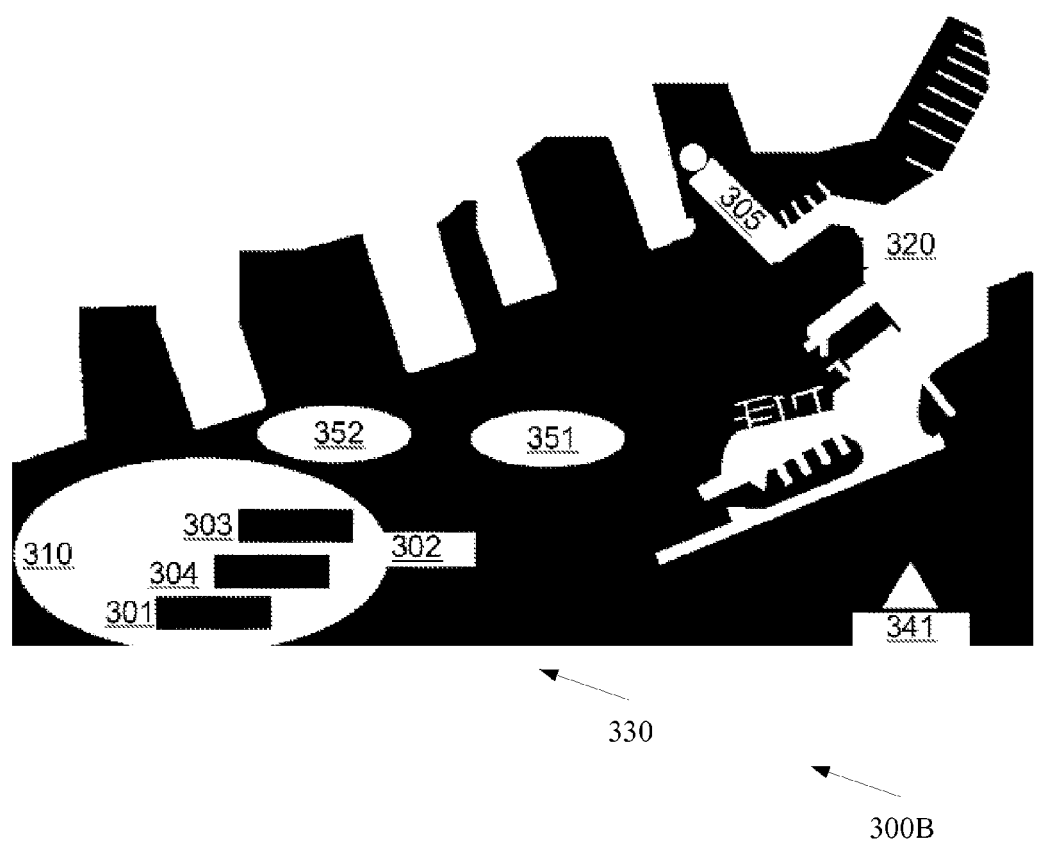
FIG. 3B is a filtered port image, according to some embodiments of the present invention.
Figure 3C:
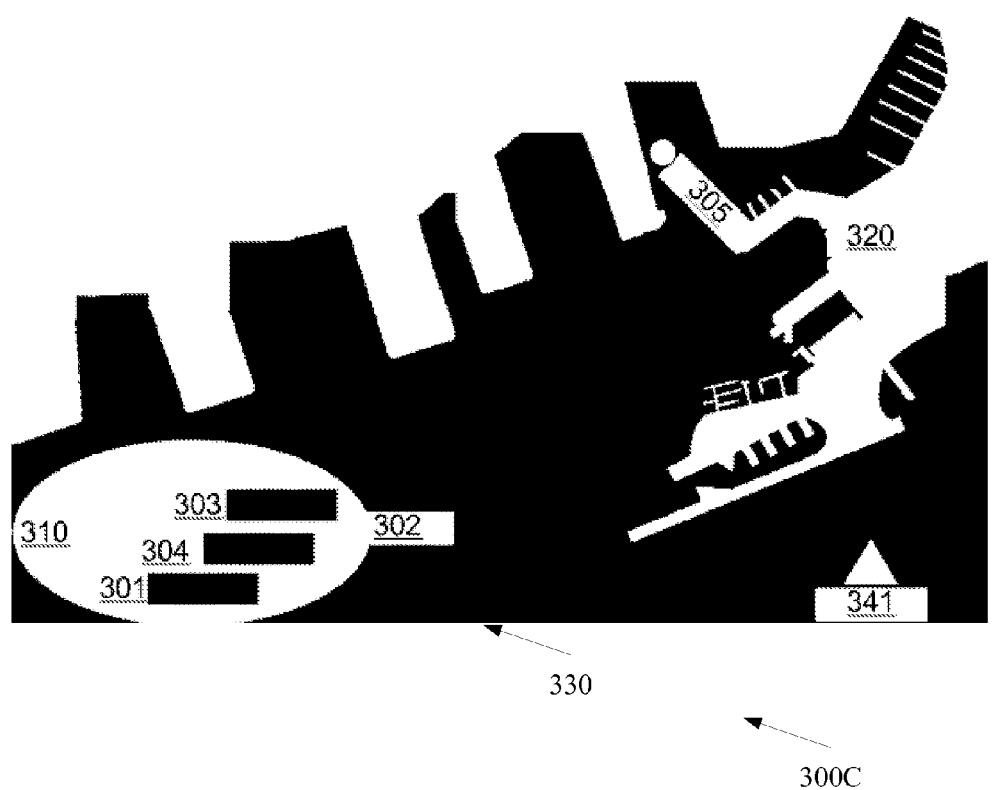
FIG. 3C is a port image containing a noteworthy pattern, according to some embodiments of the present invention.

Reference is made to FIGS. 3A-3E illustrating port 300 images before, during and after generating monitoring rules for management and monitoring vessels in a port using, according to some embodiments of the present invention. According port regulations in many of the world's international ports, vessels are docked using pilot services. A water area is designated for waiting vessels, typically in proximity to port entrance. Pilots routinely get calls for services from vessels, pick up vessels from waiting area and escort them to the docks. Deviations from this scenario, such as a vessel 301-309 not waiting in the waiting area 310 and/or a vessel 301-309 entering a port without a pilot 341-343, may result in the vessel 301-309 ending up in the wrong dock terminal, in serious time delays, fines, ineffective working relationships with local ports, uncertainty in delivery times and/or financial losses for maritime shipping companies. A user may recognize such a deviation from the above described scenario as a noteworthy pattern. According to one embodiment of the present inventions, monitoring rules are defined to detect such scenarios. Such monitoring rules are then applied to a sequence of images presenting spatio-temporal data and detect similar occurrences of such scenarios In FIG. 3A the pilot's 341 spatial location is in the water area 330, as indicated by the image object's location. Vessel 305 is properly docked at the docks area and does not require a pilot. Vessels 301-304 are properly located in the waiting area 310 space. Vessels 341-343 are pilot vessels, providing escort services of vessels from the waiting area 310 to the docks 320. The pilots 341-343 are not escorting other vessels. As the user is interested in port docking, the user limits the spatial region presented. Such visual exploration may be conducted by choosing image coordinates, marking a region, clicking image objects, dragging region markings, selecting from a regions menu etc. The result of the region limitation is illustrated in FIG. 3B. In FIG. 3B vessel 302 is outside of the waiting area appliance 310 approaching the docks 320 without pilot 341-343 guidance. Once the user recognizes such an alerting incidence, the user may decide to reduce image noise by limiting the presented image objects to vessels 301-305, pilots 341 and regions 310, 320, 330. Such visual exploration may be achieved by positively selecting the remaining types, i.e. vessels 301-305 and pilots 341 or by restricting the undesired image object type, i.e. the buoyancies 351-352. The image object restriction results are illustrated in FIG. 3C in which buoyancies 351-352 do not appear. The user may indicate an alert at this point in the process.

Optionally, a monitoring rule is automatically generated based on the visual exploration performed by the user. The user's operations during the visual exploration, such as zooming, applying a filter, entering a parameter etc. are used for automatically generating a rule containing corresponding conditions. Optionally, multiple monitoring rules are automatically generated based on the user's visual exploration. Optionally, the user selects from a list of automatically generated monitoring rules the rules which are to be executed. Optionally, the user modifies the automatically generated rules following their generation. Optionally, the monitoring rules are generated by combinatorial combining different conditions used during the visual exploration. Optionally, prior to utilizing data from the visual exploration, a filtering step is carried out: eliminating operations which are opposite to one another, colliding operations which are subsequent to one another and together have a complementary effect, such as subsequent increasing zooming steps.

Optionally, image(s) of multiple resembling alerts are grouped for automatic generation of monitoring rules. The FIGS. 300A-C and/or the spatio-temporal attributes used in their visual exploration are saved along with an alert indication. Upon identification of a similar alert other images and/or their visually explored spatio-temporal attributes are added to be grouped with the former FIGS. 3A-C. Optionally, negative instances, i.e. images without the alert, are also provided for automatically generating a monitoring rule.

Optionally, monitoring rules are generated by a combination of user input and automatic suggestions of location and/or temporal characteristics and/or any relevant data attribute. Suggested location and/or temporal characteristics may be identified according to spatio-temporal attributes utilized in the visual exploration step and/or analyzed spatial/temporal patterns. Optionally, the suggested characteristics are provided by the element suggestion engine as monitoring rule elements. Optionally, the user combines monitoring rule elements to generate a monitoring rule. For example: monitoring rule element comprises a distance between two vessels, a vessel wait time in wait area and binary indication of entrance to port area. The user combines two suggested monitoring rule elements: the distance between vessels and the binary indication of entrance to port area. The user then adds the type of the vessel to the vessel distance element so one vessel is a pilot ship and the other is a cargo ship. The user further adds a parameter to the distance such as 400 meters. Then the user approved a monitoring rule for monitoring pilot escorting in a port which is applied to further images. Optionally, the user authorizes suggested monitoring rule(s) as they were suggested. Optionally, the user modifies parameters of suggested location and/or temporal characteristics, prior to confirming a monitoring rule. Optionally, the user adds additional characteristics to generate a monitoring rule. The additional characteristics may be non-temporal and not located related. Optionally, the user duplicates, modifies, edits, revises, changes and/or amends identified location and/or temporal characteristics as part of monitoring rules generation process. Optionally, the user selects identified location and/or temporal characteristics, and combines them to generate monitoring rules. Optionally, the characteristics selection is performed by dragging, clicking, hovering over and/or selecting an area containing a characteristic presented object.

Figure 3D:
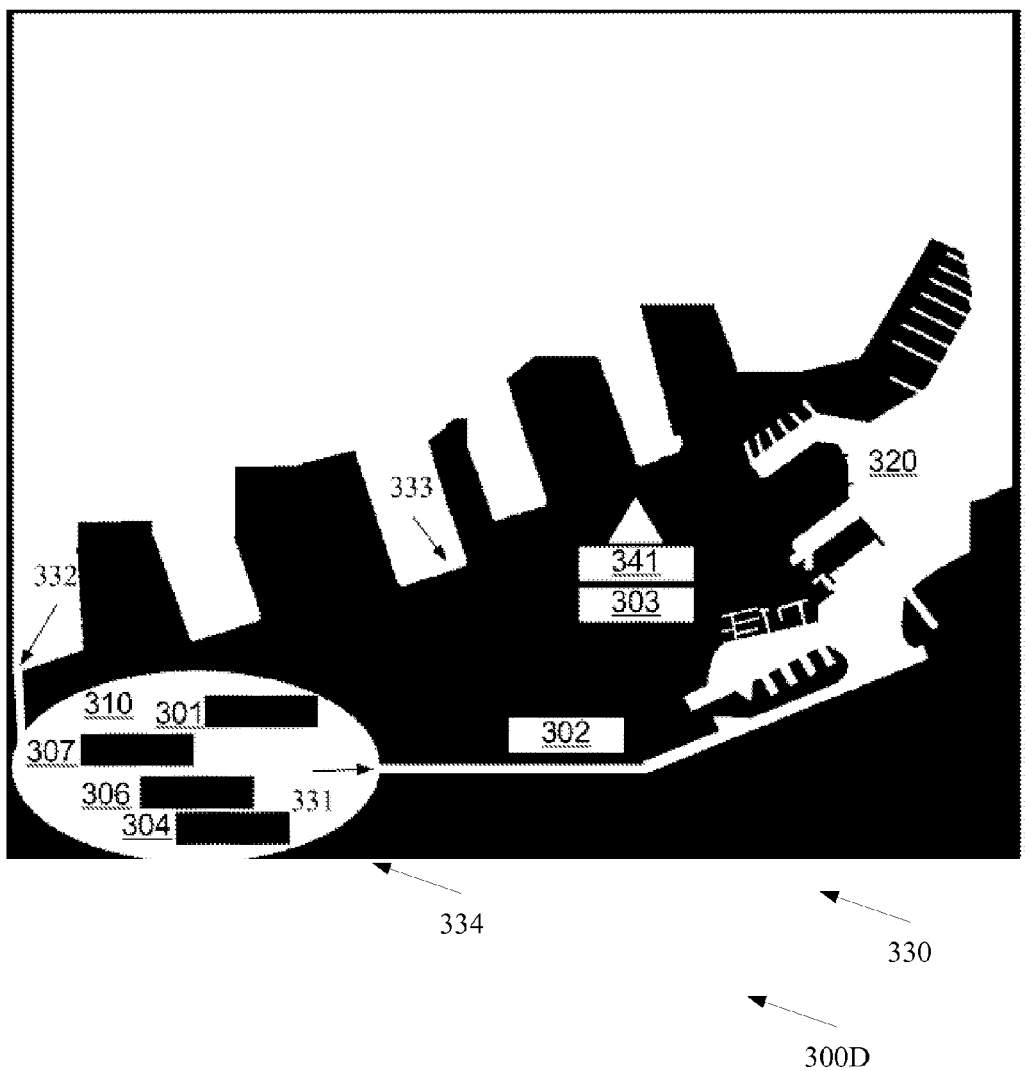
FIG. 3D is a port image with elements added by a user for defining monitoring rules, according to some embodiments of the present invention.
Figure 3E:
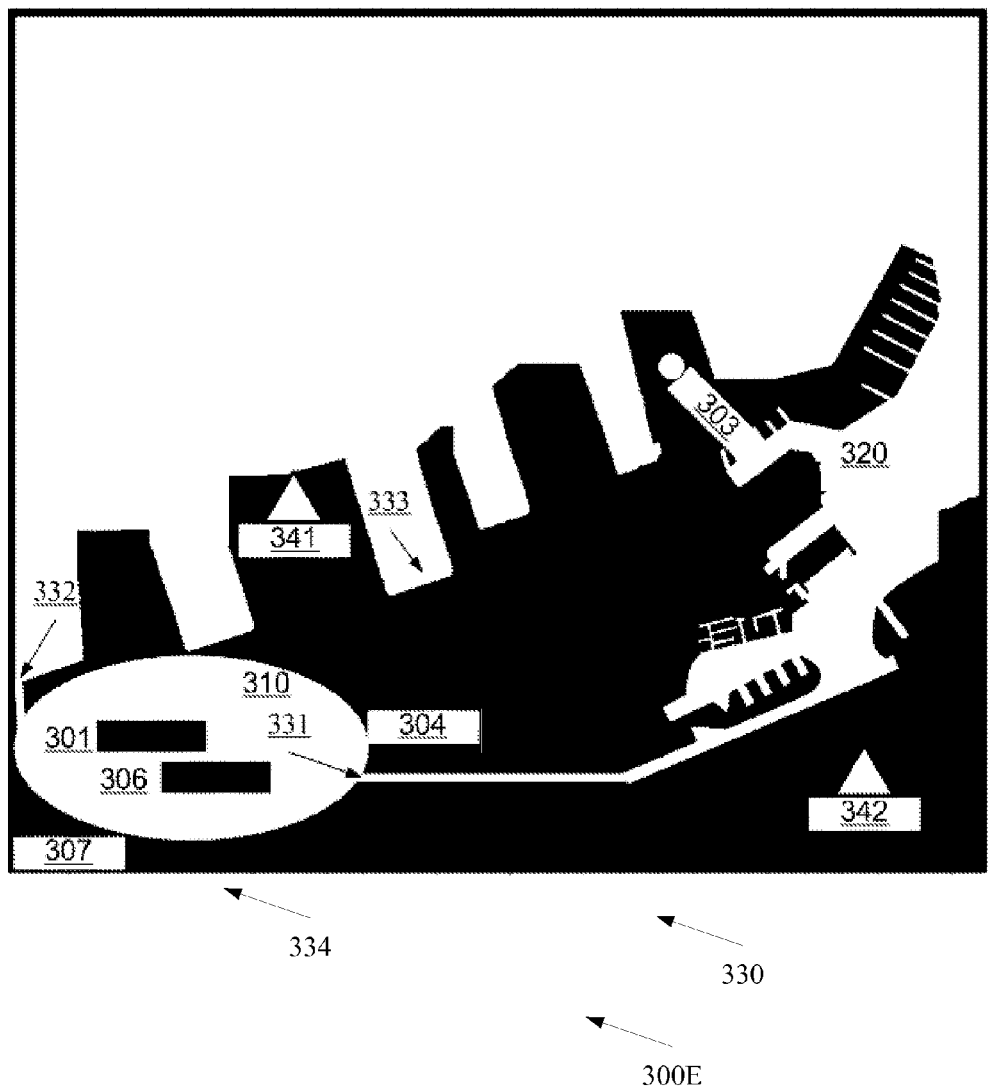
FIG. 3E is a port image after application of monitoring rules, according to some embodiments of the present invention.

Optionally, the visual exploration continues after an alerting condition, desired for monitoring, is detected. Continued visual exploration may be used for clarifying a picture, for refining the spatio/temporal patterns selected by the user and/or for refining identified location/temporal characteristics. Continued visual exploration is shown, for example, in the difference between FIG. 3B and FIG. 3C. FIG. 3B is subject to a filter which excludes buoyancies image objects 351-352. The result of the filter is illustrated in FIG. 3C. In FIG. 3C the port image 300C is comprised of a few types of image objects: regular vessels 301-305, a pilot 341-343 and spatial regions appliance 310, 320 and 330. Buoyancies 351-352 image objects are not presented. After filtering the user may wish to define a new image object to be used in the monitoring rule about to be created. In FIG. 3D the user draws two lines 331, 332 between the waiting area 310 and the docks regions 320. These lines 331,332 divide the water region 330 to two sub regions: within the port 333, outside of the port 334. Optionally, new monitoring rules are suggested utilizing the newly defined regions 333, 334. The monitoring rules may be defined as described above. Optionally, modifications to existing monitoring rules are suggested once a new image object 333, 334 is defined. The modifications may comprise the newly defined image object 333, 334 and a set of parameters. An exemplary monitoring rule including newly created image objects 333, 334 is: If a vessel 301, 304, 306, 307 is partially or fully inside the port region 333 and no pilot is within 10 meters from it and the vessel is not docked—send an alert to that vessel, to all pilots within 1 kilometer of port and to the port head quarter and to the shipping company. After the monitoring rule is defined it is applied to single images, a sequence of images and/or data such as a video stream from a camera, a satellite, a web channel, a movement monitor, a radar system, location data sources such as GPS, Automatic Identification System (AIS) etc. In FIG. 3E the above described monitoring rule is applied to all vessels 301, 303, 304, 306, 307, 341 and 342. The rule is not applied to other image objects such as, for example, regions 310, 320, 330, 333, 334. The monitoring rule does not create an alarm for vessels 301, 306 which are fully within the waiting region 310, vessel 303 which is docked, vessel 307 which is in a region external to the port 334 or for vessels 341, 342 which are of pilot type. The monitoring rule recognizes vessel 304 as being inside the port 333 without a pilot 341, 342 and alerts the vessel 304 and the pilots 341, 342 as well as the port headquarters and the shipping company. Optionally, observing an occurrence of conditions according to one (or more) monitoring rule(s) results in an event. The event may be generating an alert, sending a message, operating an automatic device such as opening a gate, closing a gate, disabling an identification system etc. Optionally, the occurrence is an exact repetition of the conditions initiating the monitoring rule. Optionally, the occurrence conditions are an extended version of the original conditions according to which the monitoring rule was generated. Optionally, the alert is provided as a displayed notification in the same system monitoring the images. Optionally, the event is sending a message to an external system other than the image monitoring system. The message may be an instant message (IM), a short message service (SMS), a voice message (VM) and/or an electronic mail (email). The external system may be a mobile phone, a tablet, a computer and/or a land line phone.

Both spatio-temporal attributes and non spatio-temporal attribute of image objects are presented in FIGS. 3A-3E. For example, the size and the coordinates of the buoyancies 351-354 are a spatio-temporal attributes. In FIG. 3A the size of the ovals 351-354 representing buoyancies are proportional to the buoyancies' 351-354 physical radius. The vessel 301-304, 341 type, in this embodiment, is a non spatio-temporal attribute of the vessel image object. The vessel type is visually indicated in FIG. 3A as a rectangle and triangle combination for pilots 341-343 and as a rectangle for vessels 301-309. Optionally, presented spatio-temporal attributes are: physical dimensions, object type, current location, direction of movement, state (docked, sailing) etc. Some spatio-temporal attributes are inherent to the image object and do not change over time and/or through space. For example, the physical dimensions of a vessel and/or buoyancy. Other attributes may change over time and/or through space such as, for example, the orientation of a vessel. Some attributes are deduced from a single image, while other attributes are extracted from a sequence of images, for example the speed of a vessel and its direction of movement.

A single sequence of images, such as for example FIGS. 3A-3E may result in generation of multiple monitoring rules. In addition to the monitoring rule described above, the following monitoring rules may prevent the occurrences described above:

1. A vessel must be in the waiting region 310 to initiate a call for a pilot 341-343. Vessel 302 can initiate a call for a pilot 341, 343 in FIG. 3A but not in FIG. 3B since it is out of the waiting region 310.
2. If a pilot 341-343 did not leave the waiting region 310 along with a vessel within 10 minutes of entering the waiting region 310 alert the calling vessel which summoned the pilot.

Figure 4:
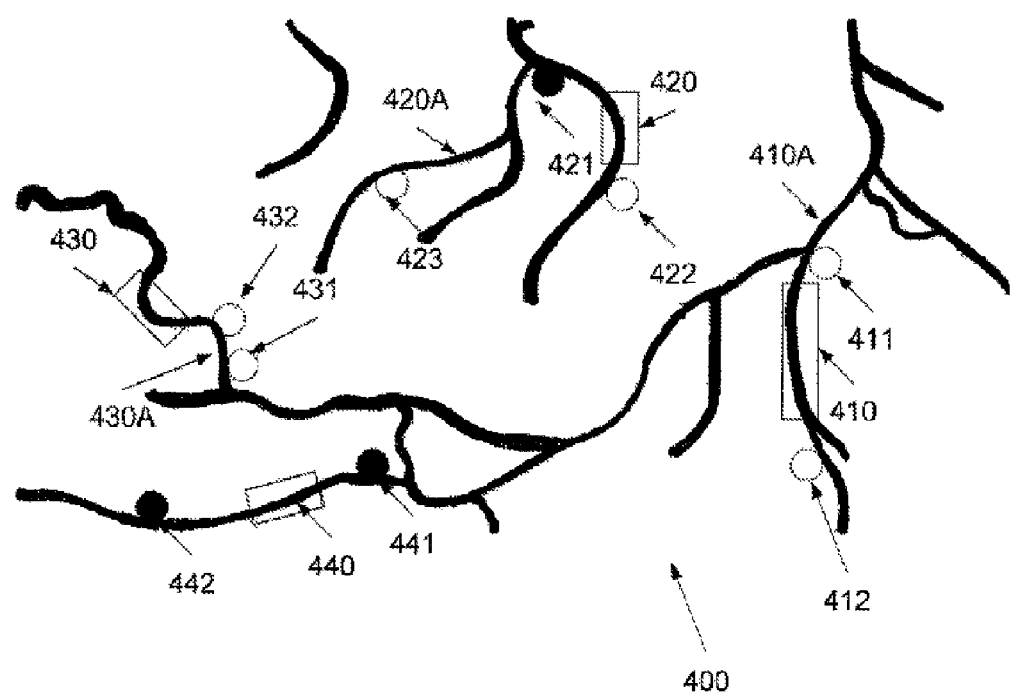
FIG. 4 is an illustration of haul trucks on single-lane and multi-lane roads in a mine, according to some embodiments of the present invention.

Reference is now made to FIG. 4 illustrating haul trucks 411-412, 421-423, 431-432 and 441-442 on single-lane 410-430 and multi-lane roads 410A-430A in a mine 400, according to some embodiments of the present invention. Mining companies use haul trucks to load ore from the mine to refinery factories. Mine roads are typically narrow and long. Driving and maneuvering haul trucks and other vehicles in such roads are challenging. Since multiple truck (and other vehicles) share a road driving and maneuvering often puts both drivers and facilities in danger. Mining companies have, therefore, developed procedures and regulations for coping with these conditions while maintaining safety. Maintaining safety is only a first step towards optimal operation of vehicles in a mine Timely arrival of haul trucks is also required for cost effective and on schedule operation of a mine For example, a refinery factor stops its operation when no haul truck arrives. A common reason for haul truck delays is an occupied road. In a narrow road allowing passage of a single vehicle at a time, the road has to be clear before a haul truck may use it. Optionally, the physical location of haul trucks 411-412, 421-423, 431-432 and 441-442 on single-lane 410-440 and multi-lane roads 410A-430A in a mine 400 are trucked in real time. The mine image 400 is displayed and image objects representing the haul trucks are displayed according to the tracked locations. A user indicates a noteworthy pattern, such as two haul tracks trucks moving into a single-lane road in opposite directions. Monitoring rules are generated based on user's indication and the monitoring rules are applied to other mine images from the monitored environment. Upon fulfillment of a monitoring rule by image objects and/or their respective tracked parameters a notification is generated.

Road 410 is a single-lane road enabling passage of a single vehicle at a time. When two haul trucks 411, 412 are moving from the two ends of the road 410 towards the other they may be notified about it only once in close proximity, for example, as part of a collision avoidance system. Both trucks 411, 412 stop and one of them, for example 411, backs up until a multi-lane 410A segment of the road is reached. Such a pattern may be identified by a user as part of the mine image 400. The following monitoring rule is generated accordingly: If truck A enters to a single-lane road and truck B is moving in the opposite direction to truck A then alert the trucks' operator, stop truck A and notify truck B. The monitoring rule is generated as described in FIG. 3. This monitoring rule is then applied to images such as 400. The entrance of truck 422 to the single-lane road segment 420 will not trigger an alert as the tack on the opposite side 421 is stationary (indicated with a full black circle). Truck 423 which is on the move, as indicated by a white circle, will not trigger an alert given the above mentioned monitoring rule as it has many optional routes other than entering road 420. Trucks 431, 432 are both on the move, but will not trigger an alert either, as they are on a multi-lane road segment 430A. These tracks trucks 431, 432 will also not trigger as alert with respect to the single-lane road 430 since they are on the same side of that road segment 430. In a similar manner, tracks trucks 441, 442 which are on opposite sides of the single-lane road 440, will not trigger an alert by the above described monitoring rule as they are both stationary.

Figure 5:
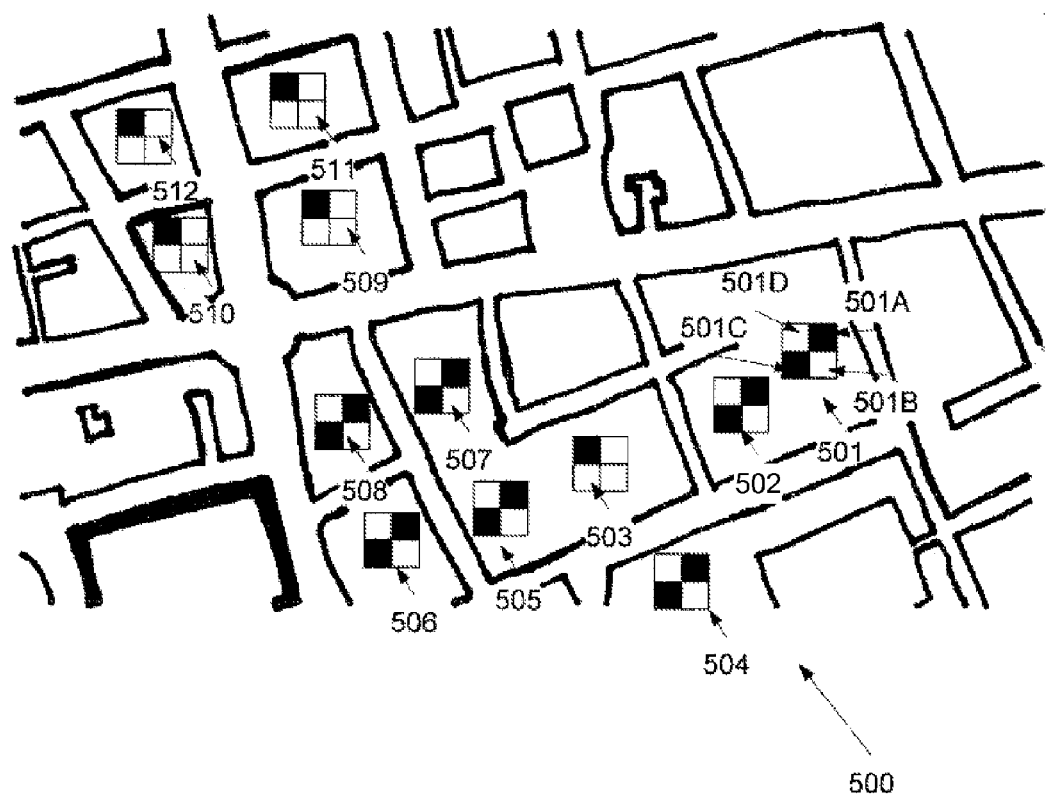
FIG. 5 is a schematic illustration of electricity consumption patterns across a city map, according to some embodiments of the present invention.

Reference is now made to FIG. 5 illustrating electricity consumption patterns 501-512 across a city map 500, according to some embodiments of the present invention. Electricity consumption rates are determined by property usage. Commercial rates are typically higher than residential rates. Property classification often relies on customer declaration. An electricity provider, interested in verifying property type visually explores an image representing a city map 500 with electricity consumption of consumption units. The electricity provider user defines a visualization matrix: breaking the 24 hour day into 4 segments showing morning, afternoon, evening and night time. These are visually presented as four proximal squares 501A-501D. The squares are colored according to some threshold of electricity consumption: white 501B indicates below threshold (low consumption) and black 501A indicates same or above threshold (high consumption). Such visualization allows the user to identify electricity consumption patterns 503 deviating from patterns of nearby properties 501-502 and 504-508, thereby indicating potential misclassification. The same electricity consumption pattern 503 is recognized as an outlier within a one spatial context 501-502 and 504-508 but not within another spatial context of consumption patterns 509-512. Optionally, outliers are automatically detected after user defines meter consumption pattern. Optionally, outliers are automatically indicated as noteworthy patterns. Optionally, the pattern 501-509 is examined against a property tag. Optionally, multiple presentations of the electricity consumption are presented side by side.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant user interfaces will be developed and the scope of the term user interface is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for generating monitoring rules from a user marking of visual data, comprising:
   presenting on a display a spatio-temporal data comprising images representing a plurality of physical objects in a space during a period;
   while said spatio-temporal data is presented on said display, receiving a plurality of visual selections on said display from a user, said plurality of visual selections marking a region on said display;
   analyzing said region in said images to identify a spatio-temporal pattern defining at least one relationship between some of said plurality of physical objects in said region, wherein said spatio-temporal pattern comprises at least one a location related characteristic and at least one temporal related characteristic of some of said plurality of physical objects in said region; and
   automatically generating at least one quantifiable monitoring rule to track a following occurrence of said spatio-temporal pattern by identifying said at least one location related characteristic and said at least one temporal related characteristic of a new physical object represented in a new spatio-temporal data of said space in a following period.

2. The method of claim 1, wherein said spatio-temporal data is provided by a sequence of video images depicting movement of said plurality of physical objects in said space.

3. The method of claim 1, wherein said location related characteristic is a combination of a portion of a plurality of spatio-temporal attributes of said plurality of physical objects.

4. The method of claim 1, wherein said plurality of visual selections are determined by analyzing how a user visually explores said spatio-temporal data.

5. The method of claim 1, wherein said plurality of visual selections are performed by applying a member of a group consisting of: a filtering condition on said spatio-temporal data, a filtering condition to said plurality of physical objects, a filtering condition to a plurality of spatio-temporal attributes of said plurality of physical objects, mapping at least one of said plurality of spatio-temporal attributes to said plurality of physical objects, coloring code mapped said at least one of said plurality of spatio-temporal attributes, mapping at least one of said plurality of spatio-temporal attributes to a visually distinct shape and generating a spatio-temporal attribute for said plurality of physical objects by relating at least a pair of said plurality of spatio-temporal attributes;
   said plurality of visual selections is performed by a user performing at least one of: selecting a sub area of said space during a certain time frame of said period, hovering over an object of said plurality of physical objects, clicking on an object of said plurality of physical objects and tagging an object of said plurality of physical objects; and
   said analyzing is performed according to said plurality of visual selection.

6. The method of claim 1, wherein said plurality of visual selections is performed by a plurality of modifying actions and said automatically generating a plurality of monitoring rule elements is performed according to each action.

7. The method of claim 6, further comprising:
recognizing a plurality of relationships between said plurality of modifying actions;
filtering a sub-set of said plurality of modifying actions according to recognized said plurality of relationships.

8. The method of claim 1, further comprising:
applying said at least one monitoring rule to a new inspected set of video images.

9. The method of claim 1, further comprising:
applying said at least one monitoring rule to a plurality of dynamic physical objects, each having a plurality of changing spatio-temporal attributes.

10. The method of claim 1, further comprising:
defining, by a user, at least one condition for applying said at least one monitoring rule.

11. The method of claim 1, wherein said presenting on a display is triggered by availability of said spatio-temporal data.

12. The method of claim 1, wherein said automatically generating a plurality of monitoring rule elements is performed by extracting filter elements from a filter used for said selecting.

13. The method of claim 1, wherein said automatically generating a plurality of monitoring rule elements is performed by extracting at least one mapping attribute from a visual mapping used for said selecting.

14. The method of claim 1, wherein said automatically generating a plurality of monitoring rule elements is performed by extracting a second plurality of spatio-temporal attributes from said region of said image.

15. A computerized method for generating monitoring rules from a user marking of visual data, comprising:
a non-transitory computer readable storage medium;
first program instructions to present on a display, to a user, spatio-temporal data comprising images representing a plurality of spatio-temporal attributes of a plurality of physical objects in a space during a period;
second program instructions to enable a user to input a plurality of visual selections marking on said display a region;
third program instructions to analyze said region in said images to identify a spatio-temporal pattern defining at least one relationship between some of said plurality of physical objects in said region, wherein said spatio-temporal pattern comprises at least one a location related characteristic and at least one temporal related characteristic of some of said plurality of physical objects in said region fourth program instructions to automatically generate a plurality of monitoring rule elements according to said plurality of visual selections;
fifth program instructions to automatically apply at least one monitoring rule created using at least one of said plurality of monitoring rule elements for tracking following occurrence of said spatio-temporal pattern by identifying said at least one of a location related characteristic and said at least one temporal related characteristic of a new physical object represented in a new spatio-temporal data of said space in a following period;
wherein said first, second, third, fourth, and fifth program instructions are stored on said non-transitory computer readable storage medium.

16. A system for generating monitoring rules from a user marking of visual data comprising:
a processor;
a user interface enabling a user to input a plurality of visual selections marking a region on a display identifying a spatio-temporal pattern represented in a spatio-temporal data while said spatio-temporal data is presented on said display;
a displaying unit which displays to a user said spatio-temporal data comprising images representing a plurality of physical objects in a space during a period; and
a rule element suggestion engine configured to instruct said processor to analyze said region in said images to identify said spatio-temporal pattern defining at least one of a location related characteristic and at least one temporal related characteristic of some of said plurality of physical objects in said region, and configured to instruct said processor to automatically generate a monitoring rule to track a following occurrence of said spatio-temporal pattern by identifying said at least one location related characteristic and said at least one temporal related characteristic of a new physical object represented in a new spatio-temporal image data of said space in a following period.

17. The system of claim 16, wherein said rule element suggestion engine is configured to instruct said processor to generate automatically a plurality of monitoring rule elements according to modified said selected said spatial-temporal pattern wherein said monitoring rule comprises at least one of said monitoring rule elements.

18. The system of claim 16, wherein said user interface enables a user to modify displayed said image and to create at least one monitoring rule using at least one of a plurality of monitoring rule elements.

* * * * *